United States Patent [19]

Rionda et al.

[11] 4,455,805

[45] Jun. 26, 1984

[54] TRUSS ASSEMBLY AND TRUSS HANGER FOR USE WITH TRUSSES

[75] Inventors: Carlos S. Rionda; Joaquim J. Palacio, both of Miami, Fla.

[73] Assignee: Gang-Nail Systems, Inc., Miami, Fla.

[21] Appl. No.: 423,169

[22] Filed: Sep. 24, 1982

[51] Int. Cl.³ .............................................. F16B 5/00
[52] U.S. Cl. .................................. 52/712; 403/232.1; 52/DIG. 6; 52/289
[58] Field of Search .................. 52/DIG. 6, 693, 289, 52/712, 702; 411/461–464, 466–468; 403/232.1, 405, 283

[56] References Cited

U.S. PATENT DOCUMENTS

| | | | |
|---|---|---|---|
| 666,918 | 1/1901 | Butz | 403/232.1 |
| 2,911,690 | 11/1959 | Sanford | 403/232.1 |
| 3,365,222 | 1/1968 | Polyak | 52/712 |
| 3,961,455 | 6/1976 | Peters | 52/693 |
| 3,989,398 | 11/1976 | Wendt | 403/232.1 |
| 4,078,352 | 3/1978 | Knowles | 52/693 |
| 4,297,048 | 10/1981 | Jureit | 411/466 |

FOREIGN PATENT DOCUMENTS

468708  7/1972  Canada .................. 52/702

*Primary Examiner*—John E. Murtagh
*Assistant Examiner*—Kathryn L. Ford
*Attorney, Agent, or Firm*—LeBlanc, Nolan, Shur & Nies

[57] ABSTRACT

A truss assembly and truss hanger for use with trusses is disclosed. A truss hanger in accordance with the invention comprises a bracket having a first leg with first and second ends, the first leg having a side which is adapted to engage the width of a beam, a base disposed in a first plane having first and second ends, the first end of the base being attached to the first end of the leg at approximately a 90° angle, the base being adapted to engage the top of the beam and a second leg disposed in a second plane which is parallel to the first plane and is attached to the second end of the base at an approximate 90° angle, the second leg being adapted to engage a second side of the beam across its width; and an attachment member having upper and lower connecting plates disposed at opposite ends of an intermediate member, said attachment member being joined to the first leg to form a substantially 90° angle therewith and projecting away from the opposite side of the first leg which is adapted to engage the beam, said connecting plates having a plurality of sharp projections extending generally perpendicular from the plane of the connecting plate for use in fixedly attaching the connecting plate of each truss hanger to wooden members within the trusses.

9 Claims, 7 Drawing Figures

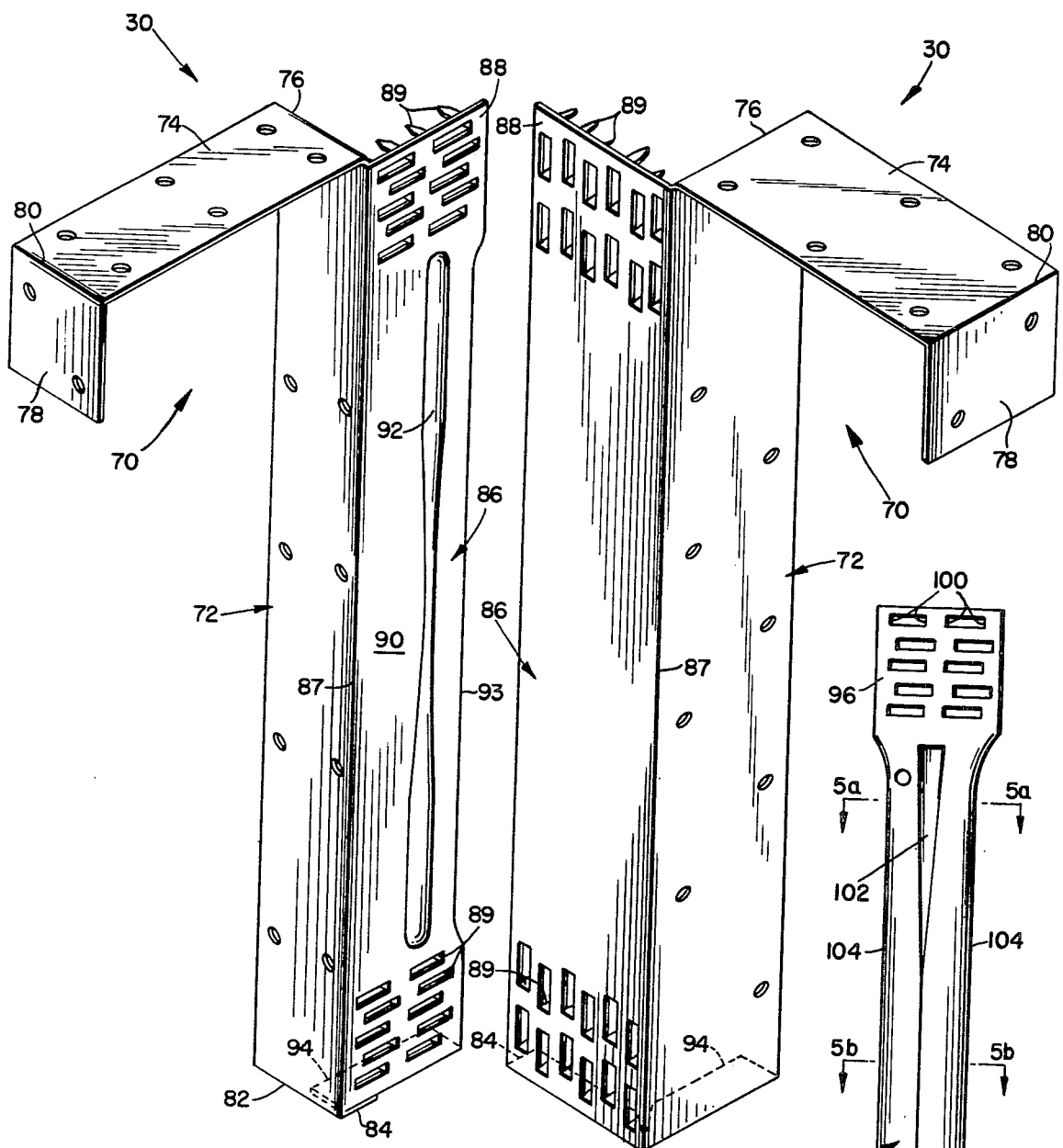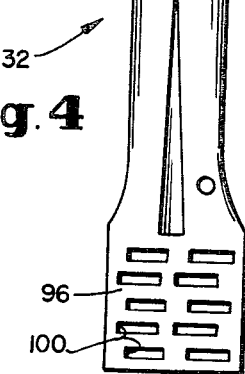

TRUSS ASSEMBLY AND TRUSS HANGER FOR USE WITH TRUSSES

CROSS REFERENCE TO RELATED APPLICATIONS

U.S. patent application Ser. No. 337,671 entitled TRUSS STRUCTURES CONSTRUCTED WITH METAL WEB MEMBERS filed on Jan. 7, 1982 which names Robert Gottlieb as the inventor and which is assigned to the assignee of the present invention, discloses trusses and metal brackets which may be used for constructing trusses in accordance with the present invention. This application is incorporated herein by reference.

BACKGROUND OF THE INVENTION

1. Field of the Invention

The present invention relates to wooden trusses used for supporting structural loads and to hardware used in constructing wooden trusses which enhances the ease of installation and increases the resultant structural rigidity of the installed trusses for bearing structural loads.

2. Description of the Prior Art

In constructing various types of wooden truss assemblies, including both roof trusses and floor joists, it has been common to use large wooden structural members such as 2"×10"s. Such large wooden members, however, are becoming increasingly difficult to obtain and have increased in cost substantially. Consequently various alternatives have been sought for enabling the construction of trusses which are able to bear the structural loads of full dimension lumber but which are constructed from smaller pieces of dimension lumber such as 2"×4" members which are spaced apart by metal connectors. Substitutes for full dimension lumber roof trusses and floor joists must satisfy two primary criteria. First, the trusses must be able to withstand large compressive loads so that they may be used for bearing substantial structural loads. Secondly, it is desirable that the trusses be prefabricated at a manufacturing plant at a low labor cost and shipped to a building site without a high degree of risk of incurring damage to the trusses.

Various types of hardware have been developed for making prefabricated trusses. U.S. Pat. Nos. 3,025,577 to Jureit, 3,298,151 to Jureit and 4,078,352 to Knowles and the aforementioned U.S. Ser. No. 337,671 are representative of metal connectors which have been used for manufacturing trusses from dimension lumber such as 2"×4"s.

The aforementioned U.S. patent application Ser. No. 337,671 entitled TRUSS STRUCTURES CONSTRUCTED WITH METAL WEB MEMBERS filed on Jan. 7, 1982 discloses a metal web member which has a reinforced leg having a projection which runs substantially the entire length of the leg and which projects in the direction of the sharp projections of connecting plates disposed at the ends of the leg. The height of the projection varies from a maximum in proximity to the connecting plates to a minimum in proximity to the midpoint between the connecting plates. A pair of flanges are joined to the outside edges of the leg along the length of the leg which flanges project in the direction of the sharp projections of the connecting plates. The height of the projection of the flanges varies from a minimum in proximity to the connecting plates to a maximum in proximity to the midpoint between the connecting plates. A pair of projections at each end of the legs may be used in place of the single projection which extends the length of the leg.

Attachment members have been marketed for connecting together the spaced apart wooden members which are used for constructing trusses. These attachment members have first and second connecting plates disposed at opposite ends of an intermediate section which extends transversely between the ends of of the spaced apart first and second wooden member of the truss. The intermediate section of the aforementioned attachment members contains a plurality of ridges which project outward away from the direction that the sharp projections in the connecting plates project when engaging the spaced apart first and second wooden members of the truss.

Trusses have been installed at the building site in a number of ways. If the trusses are being used to construct a floor, they may be laid on top of the foundation walls and nailed into a beam which extends perpendicular to the longitudinal axis of the trusses. The trusses have been nailed in place by toenailing through various surfaces of the wood at the end of the truss.

It has been found that trusses of long length have the property of flexing to an undesirable extent if the center between the ends of the truss is not braced with a transverse beam when heavy structural loads are placed near the center. Thus, while it is the case that trusses manufactured at factory sites have eliminated the need for using expensive full dimension lumber, it is nevertheless the case that to some extent they have the property of undesirable flexation when they are used for long spands in supporting heavy structural loads.

SUMMARY OF THE INVENTION

It is an object of the invention to provide a hanger for attaching trusses to beams running transverse to the longitudinal axes of the trusses which does not require the extensive use of attachment elements through the wooden members.

The hanger for trusses provides a mechanism for attaching the trusses fixedly to a beam running perpendicular to the longitudinal axis of the individual trusses which eliminates the need for using toenailing or other types of connection mechanisms which require the extensive use of fasteners. Normally, a pair of "left and right" hangers is attached to both ends of each truss to provide a bracket which may be laid over the top of the beam without the use of extensive labor.

A hanger for trusses in accordance with the invention includes a bracket having a first leg with first and second ends, the first leg being disposed in a first plane and having a surface which is adapted to engage the width of a beam, a base having first and second ends, the first end of the base being attached to the first end of the leg at approximately a 90° angle, the base being adapted to engage the top of the beam, a second leg disposed in a second plane which is parallel to the first plane and is attached to the second end of the base at an approximate 90° angle, the second leg being adapted to engage a second side of the beam across its width; an attachment member having upper and lower connecting plates disposed at opposite ends of an intermediate member, said attachment member being joined to the first leg to form a substantially 90° angle therewith and projecting away from the opposite side of the first leg which is adapted to engage the beam, said connecting plates having a plurality of sharp projections extending generally perpendicular from the plate for use in fixedly attaching the connecting plate to the wooden members within trusses.

The hanger further includes a support shelf attached to the second end of the first leg, the support shelf forming an approximate 90° angle with respect to the first leg and projecting away from the opposite side of the first leg which is adapted to engage the beam and a support shelf attached to the lower connecting plate at an approximate 90° angle therewith and projecting in the direction of the projections of the lower connecting plate.

The intermediate section comprises at least one projection formed therein which extends in the same direction as the sharp projections of the connecting plates and which extends substantially the entire length of the intermediate section between the connecting plates, a side flange attached to the intermediate section along its length at an outside edge, the side flange projecting upward from the intermediate section opposed from the first leg.

The height of the projection varies throughout its length with the projection being highest in proximity to the connecting plates and lowest at its midpoint located between the connecting plates and the flange varies in depth throughout its length with the flange being highest at its center and lowest at its ends. In the preferred embodiment, the height of the flange is at least approximately ⅓ of the width of the intermediate section.

BRIEF DESCRIPTION OF THE DRAWINGS

FIG. 3(a) is an isometric view of a truss hanger in accordance with the invention;

FIG. 3(b) is an isometric view of a modification of the truss hanger of FIG. 3(a).

FIG. 4 is a top view of an attachment member in accordance with the invention;

FIG. 5(a) is a sectional view of the top view of FIG. 4 taken along section line 1—1 and;

FIG. 5(b) is a sectional view of the attachment member of FIG. 4 taken along section line 2—2.

DESCRIPTION OF THE PREFERRED EMBODIMENTS

Figure 1:
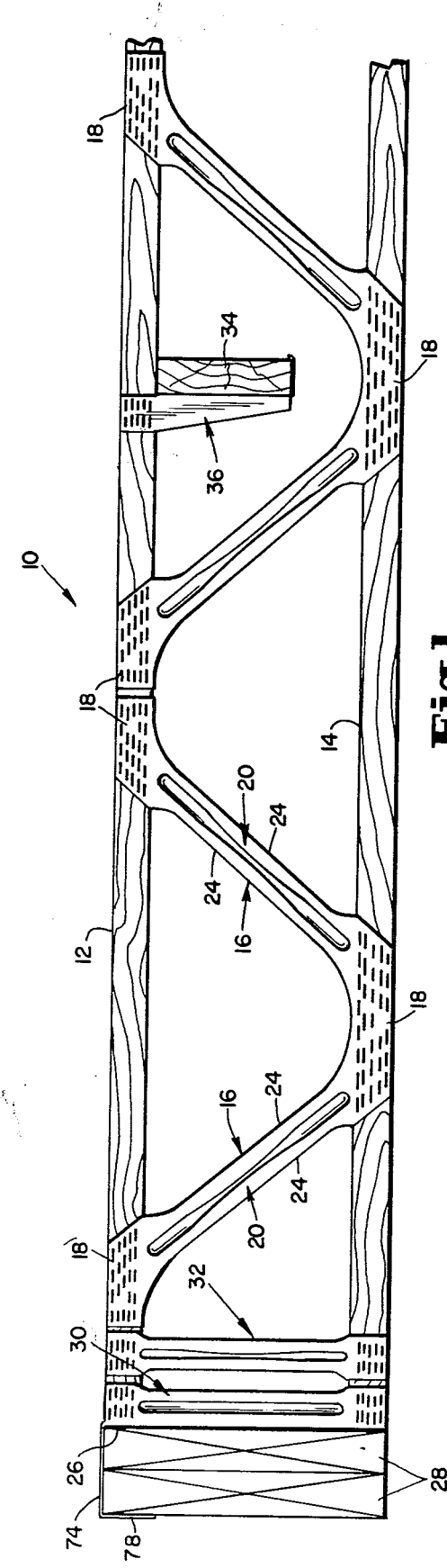
FIG. 1 is a end view of a truss assembly in accordance with the invention which illustrates the use of the truss hanger, bracing clip and attachment member.

FIG. 1 illustrates an end view of a truss 10 in accordance with the present invention which is supported at both its ends and carries a structural load of sufficient magnitude to cause an undesirable amount of flexing in the middle of the truss between the points of the attachment of its end. The truss 10 is manufactured from an upper wooden member 12 and a lower wooden member 14 which may be made from standard dimension lumber such as a 2"×4" which is turned on its side so that the width of each 2"×4" within a truss is parallel to the horizontal. The upper wooden member 12 and the lower wooden member 14 are fixedly attached to a plurality of metal web members 16 which may be of any known construction but which preferably are those which are described in the aforementioned U.S. Ser. No. 337,671. Each of the metal web members 16 has three connecting plates 18 from which have a plurality of sharp teeth-like projections which are pressed into the wood members 12 and 14 to completely embed the projections into the wood to securely attach the metal web member to the upper and lower wooden members. While the design of the sharp teeth like projections is not part of the present invention, preferably they are manufactured in accordance with the teachings of U.S. Pat. No. 4,343,580 which is owned by the assignee of the present invention. A pair of intermediate sections 20 connects the connecting plate 18 at the vertex with the connecting plates at the ends. The cross-section of the intermediate section has been specifically designed to provide increased structural rigidity against compression and twisting consequent from the application of high structural loads to the truss and is described in the aforementioned Ser. No. 337,671. Each intermediate section 20 has one or more projections extending substantially along its entire length which project in the direction of the sharp teeth like projections of the connecting plates 18. Each projection is higher and wider in proximity to the connecting plates 18 than at the midpoint located between the connecting plates. Each intermediate section has a pair of side flanges 24 located on the outside edges which project in the same direction as the sharp teeth like projections of the connecting plates 18. The lowest projection of the side flange 24 occurs in proximity to the connecting plates 18 and the highest projection occurs in proximity to the mid-point between the connecting plates. Each truss is supported at its ends 26 by a pair of truss end supporting beams 28 which run transverse to the longitudinal axis of the tursses. While it is common practice to support trusses with wooden beams in modern construction, it should be clearly understood that the invention is not limited to the use of wooden truss end supporting beams 28 and in fact may be used with any truss end supporting structure having a rectilinear cross-section. The truss 10 is connected to the truss end supporting beams 28 by means of a truss hanger 30 which is described in detail in FIGS. 3(a) and 3(b) infra. The ends of the upper wooden member 12 and the lower wooden member 14 are braced with an attachment member 32 which is attached adjacent to the point of attachment of the truss hanger 30. The attachment member is described in detail infra in conjunction with FIGS. 4, 5(a) and 5(b). One or more intermediate beams 34 provide further structural support for the truss 10 against large structural loads. Each of the beams extends transverse to the longitudinal axis of the individual upper and lower wooden members 12 and 14. The intermediate beams 34 are located between the upper and lower wooden members 12 and 14 and are fixedly attached to the upper member by means of a bracing clip 36 which is described infra in detail in FIG. 2. The function of the bracing clip 36 is to securely attach the intermediate beams 34 to the truss 10. It should be understood that the other side of the truss of FIG. 1 has a corresponding truss hanger 30, attachment member 32, and bracing clip 36 so that in actuality each truss has left and right hand versions of each of these elements for providing the maximum degree of performance.

Figure 2:
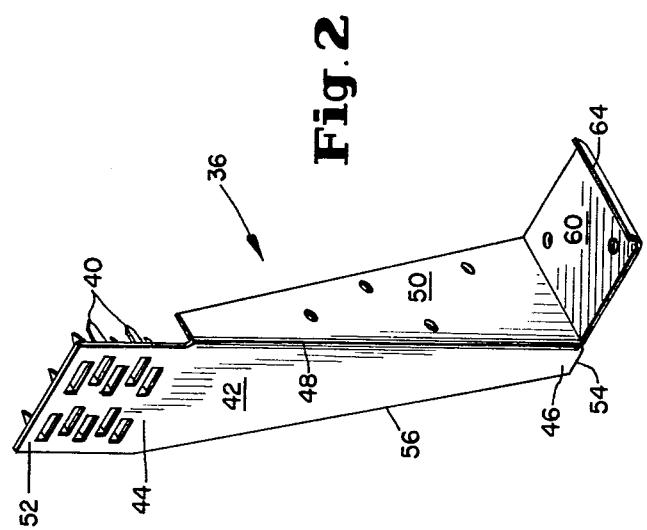
FIG. 2 is an isometric view of a bracing clip in accordance with the invention.

FIG. 2 is an isometric view of a bracing clip in accordance with the present invention. The bracing clip 36 has a connecting plate 38 which has a plurality of sharp projections 40 projecting generally perpendicularly from the plane of the connecting plate. The projections may be made in accordance with the teachings of the aforementioned U.S. Pat. No. 4,343,580. The projections 40 are adapted to attach the connecting plate 38 to the upper wooden member 12 of the truss illustrated in FIG. 1 but may be used alternatively to connect a beam to any wooden member from which it is desired to support the beam transverse to the longitudinal axis of the wooden member. A first surface 42 is disposed in a first plane and is attached to the connecting plate 38 and extends in the same plane of the connecting plate. The first surface 42 has its maximum width 44 adjacent to the point of attachment with the connecting plate 38 and its minimum width 46 located at the other end farthest from the connecting plate. Preferably, the first surface is a tetrahedron having an side 48 which extends along the entire length of the first surface and which forms the point of attachment with a second surface 50 to be described infra. The second and third sides 52 and 54 of the tetrahedron, respectively, correspond to the maximum width 44 and the minimum width 46. The sides 52 and 54 are parallel to each other. The fourth side 56 extends between the second and third sides 52 and 54. The first and fourth sides subtend an acute angle. The second surface is disposed in a second plane and is attached to the first surface along the first side 48 to form an approximate 90° angle therewith. The second surface is a tetrahedron and has a shape similar to the first surface. A plurality of apertures are contained in the second surface 50 for facilitating the attachment of nails to the width of the beam 34 which is supported by the bracing clip 36. The plane of the second surface extends parallel to the longitudinal axis of the beam which is supported by the bracing clip 36 and extends in the same direction as the projections 40. A third surface 60 which is disposed in a third plane is joined to the second surface 50 and forms an approximate 90° angle with the second plane. The third surface 60 is substantially perpendicular to the first plane and is parallel to the longitudinal axis of the intermediate beam 34. A plurality of apertures are provided in the third surface to facilitate the connection of the bracing clip to the intermediate beam which is being supported. A fourth surface 64, which is disposed in a fourth plane, is attached to the third surface 60 and forms approximately a 90° angle with the third surface and is substantially parallel to the second surface 50. The fourth surface 64 projects from its point of attachment to the third surface 60 toward the connecting plate 38. The fourth surface 64 is displaced from the second surface 50 by a distance which is preferably equal to the thickness of two inch standard dimension lumber used in construction (1.5 inches). The length of the second and third surfaces is substantially equal to the width of the lumber the bracing clip is designed to support. While the preferred use of the bracing clip is in conjunction with the attachment of intermediate support beams 34 to trusses 10 as described in conjunction with FIG. 1 supra, it should be clearly understood that the bracing clip may be used for supporting other wooden members.

The method of manufacturing the bracing clip 36 does not form part of the invention. It should be understood that any acceptable manufacturing process for stamping out the bracing clip as previously described may be used. A single blank of metal may be used as the starting point for fabricating of the bracing clip. Thereafter the clip is folded to form the previously described right angles, punched to form the apertures for providing nail holes, and further formed to produce the sharp projections 40.

FIGS. 3(a) and 3(b) are isometric views of truss hangers in accordance with the present invention. The truss hanger has a bracket 70 having a first leg 72 which is adapted to engage the side of the tuss 10 and truss end supporting beam 28 across its width. A base 74 is joined at its first end 76 to the first leg 72 of the bracket 70. A second leg 78 is joined to the second end 80 of the base 74 at an approximate 90° angle. The second leg extends parallel to the first leg 72 and runs in the same direction as the first leg to form a three sided structure in conjunction with the first leg 72 and the base 74 which functions as a bracket 70 for securely attaching the truss to the truss end supporting beams 28. The second end 82 of the first leg 72 of bracket 70 has a support shelf 84 joined thereto at an approximate 90° angle which functions as a support for the lower wooden member 14 of the truss 10 of FIG. 1. An attachment member 86 is joined to the edge 87 of the first leg 72 of the bracket 70 along its length. The attachment member 86 has a pair of connecting plates 88 located at the ends of the attachment member. The sharp projections of the connecting plates 88 are preferably manufactured in accordance with the aforementioned U.S. Pat. No. 4,343,580. The sharp projections 89 of the connecting plates are pressed into the sides of the upper and lower wooden members 12 and 14 to securely attach the hanger to the end 26 of the truss 10. The attachment member 86 has an intermediate section 90 which extends between the connecting plates 88. The intermediate section 90 may be either a flat piece of sheet metal (FIG. 3(b)) which has not been reinforced to increase its rigidity or it may have structural reinforcing elements incorporated therein (FIG. 3(b)). The preferred form of structural reinforcing elements are like those described in the aforementioned U.S. Ser. No. 337,671 for reinforcing the legs extending between the connecting plates described therein. When reinforcing elements are incorporated, one or more projections 92 are formed in the intermediate section 90 which project in the same direction as the sharp projections 89 of the connecting plates 88. The height of the aforementioned projection 92 varies such that it reaches its maximum height in proximity to the connecting plates 88 and reaches its minimum height in proximity to the mid-point located between the connecting plates. The cross-section of the projection 90 is identical to that illustrated infra in FIGS. 5(a) and 5(b) and therefore will not be described in detail in conjunction with FIG. 3. A single side flange 93 is formed in the intermediate section 90 on the outside edge thereof which is opposed to the first leg 72 of the bracket 70. The side flange 93 projects from the plane of the intermediate section 90 in the same direction as the projections 89 of the connecting plates 88. The height of the projection of the side flange 93 varies such that it reaches is maximum height at the mid-point between the connecting plates 88 and reaches its minimum height in proximity to the connecting plate 88. The variation in the height of the projection 92 and the side flange 93 is such that the width of the intermediate section is substantially constant along its length. Preferably, the maximum height of the flange is at least approximately ⅛ of the width of the intermediate section. The side flange 93 has a design like that illustrated in FIGS. 5(a) and 5(b) infra. The lower connecting plate 88 has a support shelf 94 attached thereto at an approximate 90° angle therewith. The support shelf 94 projects in the same direction as the projections 89 of the lower connecting plate 88 and functions to support the lower wooden member 14 of the truss 10. Preferably, a matched pair of left and right hand hangers 30 are used at each end 26 of a truss 10. The only difference between the left and right hand hangers is that the attachment member 86 is connected to the opposite longitudinal side of the first leg 72 of the bracket 70 so that the projections of the upper and lower connecting plates 88 face in opposite directions in the left and right hand hanger 30.

An attachment member 32 in accordance with the invention is illustrated in FIG. 4 and FIGS. 5(a) and 5(b). The attachment member 32 has a pair of spaced apart connecting plates 96 which are separated by an intermediate section 98. Each connecting plate has a plurality of sharp teeth like projections 100 which extend generally perpendicularly from the plane of the connecting plates 96. The projections 100 are preferably made in accordance with the teachings of U.S. Pat. No. 4,343,580. The intermediate section 98 has a cross sectional design which is similar to the cross sectional design of the legs which space apart the connecting plates in the aforementioned U.S. Ser. No. 337,671. A projection 102 extends substantially the entire length of the intermediate section 98. The projection 102 extends in the same direction as the projections 100 of the connecting plates 96.

FIGS. 5(a) and 5(b) which are respectively sectional views taken along section lines 1—1 and 2—2 of FIGS. 4 illustrate the variation in the height of the projection 100 along its length. Specifically, the maximum height of the projection is obtained in proximity to the point of attachment of the intermediate section 98 to the respective connecting plates 96. The minimum height of the projection is reached in proximity to the mid-point of the intermediate section 98 located between the connecting plates 96. The height of the projection 100 varies uniformly along the length of the intermediate section 98 between the highest and lowest points.

A pair of side flanges 104 are located at the outside edges of the intermediate section 98 and extend substantially the entire length of the intermediate section 98. The side flanges 104 project in the same direction as the projections 100 of the connecting plates 96. FIGS. 5(a) and 5(b) illustrate the variation in the height of the side flanges 104 along the length of the intermediate section 98. The lowest projection of the side flanges 104 is reached in proximity to the point of attachment of the ends of the intermediate section 98 to the connecting plates 96. The highest of the side flanges 104 is reached in proximity to the mid-point of the intermediate section 98 located between the connecting plates 96. The variation in the height of the projection 102 between the minimum and maximum height varies uniformly along the length of the intermediate section 98. The width of the intermediate section 98 is uniform along its length. The projection 102 and the side flanges 104 function as a means for stiffening the attachment member to sufficiently increase the rigidity of the member for avoiding any bending under compressive loads.

As an alternative to a single projection 100 extending the entire length of the intermediate section, two small projections can be used with one projection being located at each end of the intermediate section 98. When two small projections are used, the extra metal that is not taken up in forming the projections in proximity to the midpoint can be used for forming deeper side flange 104 in the central portion of the intermediate section 98. Preferably, the depth of the side flange 104 is at least approximately ⅓ of the width of the intermediate section 98.

While the preferred use of the attachment member is to connect the upper and lower wooden members 12 and 14 within a truss 10, it should be clearly understood that the invention may be used to connect together spaced apart pieces of wood for any use.

While the invention has been described in terms of its preferred embodiments, it should be clearly understood that numerous modifications may be made thereto within departing from the spirit and scope of the invention as defined by the appended claims.

What is claimed is:

1. A hanger for trusses comprising:
   (a) a bracket having a first leg with first and second ends, the first leg having a side which is adapted to engage the width of a beam, a base, disposed in a first plane, having first and second ends, the first end of the base being attached to the first end of the leg at approximately a 90° angle, the base being adapted to engage the top of the beam and a second leg, disposed in a second plane which is parallel to the first plane, and is attached to the second end of the base at an approximate 90° angle, the second leg being adapted to engage a second side of the beam across is width;
   (b) a support sheld attached to the second end of the first leg, said support shelf forming an approximate 90° angle with respect to the first leg and projecting away from the opposite side of the first leg which is adapted to engage the beam;
   (c) an attachment member having upper and lower connecting plates disposed at opposite ends of an intermediate member, said attachment member being joined to the first leg to form a substantially 90° angle therewith and projecting away from the opposite side of the first leg which is adapted to engage the beam, and each of said connecting plates having a plurality of sharp projections extending generally perpendicular from the plate for use in fixedly attaching the connecting plate to wooden members within trusses, said intermediate section having at least one projection formed therein, said projection extending the same direction as the sharp projections of the connecting plates, and extending substantially the entire length of the intermediate section between the connecting plates; and,
   (d) a support shelf attached to the lower connecting plate at an approximate 90° angle therewith and projecting in the direction of the sharp projections of the lower connecting plate.

2. A hanger in accordance with claim 1 wherein the intermediate section further comprises:
   a side flange attached to the intermediate section along its length at an outside edge, the side flange projecting upward from the intermediate section in the same direction as the sharp projections of the connector plates.

3. A hanger in accordance with claim 2 wherein:
   (a) the height of the projection varies throughout its length with the projection being lowest in proximity to the connecting plates and highest at its midpoint located between the connecting plates; and
   (b) the flange varies in height throughout its length with the flange being highest at its center and lowest at its ends.

4. A hanger in accordance with claim 3 wherein the height of said flange is at least approximately ⅓ of the width of the intermediate section.

5. A hanger in accordance with claim 3 wherein said projection is disposed approximately midway between said flange and said first leg of the bracket.

6. A wooden truss assembly comprising:
(a) a plurality of spaced apart generally parallel wooden trusses each having two ends which are adapted to be attached respectively to first and second beams; and
(b) said ends of the wooden trusses being individually attached to the beams by means of a truss hanger comprising:
 (i) a bracket having a first leg with first and second ends, the first leg having a side which is adapted to engage the width of a beam, a base disposed in a first plane having first and second ends, the first end of the base being attached to the first end of the leg at approximately a 90° angle, the base being adapted to engage the top of the beam and a second leg disposed in a second plane which is parallel to the first plane and is attached to the second end of the base at an approximate 90° angle, the second leg being adapted to engage a second side of the beam across its width;
 (ii) a support shelf attached to the second end of the first leg, said support shelf forming an approximate 90° angle with respect to the first leg and projecting way from the opposite side of the first leg which is adapted to engage the beam;
 (iii) an attachment member having upper and lower connecting plates disposed at opposite ends of an intermediate member, said attachment member being joined to the first leg to form a substantially 90° angle therewith and projecting away from the opposite side of the first leg which is adapted to engage the beam, each of said connecting plates having a plurality of sharp projections extending generally perpendicular from the plate for use in fixedly attaching the connecting plate to wooden members within the trusses, said intermediate section having at least one projection formed therein, said projection projecting in the same direction as the sharp projections of the connecting plates, and extending substantially the entire length of the intermediate section between the connecting plates; and,
 (iv) a support shelf attached to the lower connecting plate at an approximate 90° angle therewith and projecting in the direction of the sharp projections of the lower connecting plate.

7. A wooden truss assembly in accordance with claim 6 wherein the intermediate section further comprises:
a side flange attached to the intermediate section along its length at an outside edge, the side flange projecting upward from the intermediate section.

8. A wooden truss assembly in accordance with claim 7 wherein:
(a) the height of said projection varies throughout its length with the projection being highest in proximity to the connecting plates and lowest at its midpoint located between the connecting plates; and
(b) the flange varies in height throughout its length with the flange being highest at its center midway between the connecting plates and lowest at ends in proximity to the connecting plates.

9. A wooden truss assembly in accordance with claim 8 wherein the maximum height of said flange is at least approximately ⅓ of the width of the intermediate section.

* * * * *